(12) United States Patent
Kroeger et al.

(10) Patent No.: US 8,923,378 B2
(45) Date of Patent: Dec. 30, 2014

(54) EQUALIZER FOR AM IN-BAND ON-CHANNEL RADIO RECEIVERS THAT DOES NOT REQUIRE ANALOG SIGNAL BANDWIDTH INFORMATION

(71) Applicant: iBiquity Digital Corporation, Columbia, MD (US)

(72) Inventors: Brian W. Kroeger, Sykesville, MD (US); Kun Wang, West Windsor, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 13/802,994

(22) Filed: Mar. 14, 2013

(65) Prior Publication Data

US 2013/0202023 A1 Aug. 8, 2013

Related U.S. Application Data

(62) Division of application No. 12/710,534, filed on Feb. 23, 2010, now Pat. No. 8,442,170, which is a division of application No. 11/272,978, filed on Nov. 14, 2005, now Pat. No. 7,697,620.

(51) Int. Cl.
| | |
|---|---|
| *H03H 7/30* | (2006.01) |
| *H04L 27/01* | (2006.01) |
| *H04H 20/30* | (2008.01) |
| *H04H 40/18* | (2008.01) |
| *H04L 5/02* | (2006.01) |
| *H04L 25/03* | (2006.01) |
| *H04L 27/26* | (2006.01) |

(52) U.S. Cl.
CPC ............... *H04L 27/01* (2013.01); *H04H 20/30* (2013.01); *H04H 40/18* (2013.01); *H04L 5/023* (2013.01); *H04L 25/03159* (2013.01); *H04L 27/2601* (2013.01); *H04L 27/2647* (2013.01); *H04L 2025/03414* (2013.01); *H04L 2025/03439* (2013.01)

USPC ............ 375/232; 375/259; 375/229; 375/350

(58) Field of Classification Search
USPC .......................................... 375/229, 232, 230
See application file for complete search history.

(56) References Cited

U.S. PATENT DOCUMENTS

| 5,559,830 A | 9/1996 | Dapper et al. |
| 5,588,022 A | 12/1996 | Dapper et al. |

(Continued)

FOREIGN PATENT DOCUMENTS

| EP | 1232591 B1 | 8/2005 |
| WO | 2004015946 A1 | 2/2004 |
| WO | 2004075500 A2 | 9/2004 |

OTHER PUBLICATIONS

W.H. Press et al., "Numerical Recipes in C", Second Edition, Cambridge University Press, Sec. 14.8, 1988-1992, pp. 650-655.

(Continued)

*Primary Examiner* — Leon-Viet Nguyen
(74) *Attorney, Agent, or Firm* — Robert P. Lenart, Esq.; Pietragallo Gordon Alfano Bosick & Raspanti, LLP (57) ABSTRACT

A method is provided for equalizing OFDM symbol vectors received on AM in-band on-channel radio signal including a main carrier and first and second BPSK modulated subcarriers. The method comprises: computing a BPSK magnitude signal; filtering the BPSK magnitude signal; filtering complex samples received on the main carrier; using the filtered BPSK magnitude signal and the filtered complex samples received on the main carrier to compute a plurality of flat fade equalization coefficients; and multiplying the OFDM symbol vectors by the flat fade equalization coefficients. A receiver that includes an equalizer, which operates in accordance with the method is also provided.

12 Claims, 5 Drawing Sheets

(56) References Cited

U.S. PATENT DOCUMENTS

| | | | |
|---|---|---|---|
| 5,859,876 | A | 1/1999 | Dapper et al. |
| 6,044,340 | A | 3/2000 | Van Hamme |
| 6,292,511 | B1 | 9/2001 | Goldston et al. |
| 6,295,317 | B1 | 9/2001 | Hartup et al. |
| 6,480,536 | B2 | 11/2002 | Hartup et al. |
| 6,570,943 | B2 | 5/2003 | Goldston et al. |
| 6,898,249 | B2 | 5/2005 | Kroeger et al. |
| 6,904,100 | B1 * | 6/2005 | Romaniuk ............ 375/308 |
| 2002/0012392 | A1 | 1/2002 | Goldston et al. |
| 2002/0137510 | A1 * | 9/2002 | Sims et al. ............ 455/427 |
| 2002/0158988 | A1 * | 10/2002 | Wischermann ........ 348/571 |
| 2004/0146123 | A1 | 7/2004 | Lai |
| 2004/0161066 | A1 | 8/2004 | Hwang et al. |
| 2004/0162839 | A1 | 8/2004 | Udeshi et al. |
| 2004/0179578 | A1 * | 9/2004 | Ben Rached et al. ...... 375/130 |
| 2005/0074037 | A1 | 4/2005 | Rickard et al. |
| 2005/0101264 | A1 | 5/2005 | Farlow et al. |
| 2005/0107045 | A1 | 5/2005 | Kroeger |
| 2005/0141657 | A1 | 6/2005 | Maltsev et al. |
| 2005/0163256 | A1 * | 7/2005 | Kroeger ............ 375/300 |
| 2006/0013329 | A1 | 1/2006 | Han et al. |
| 2006/0052062 | A1 | 3/2006 | Heddergott et al. |
| 2006/0179313 | A1 * | 8/2006 | Wang ............ 713/170 |
| 2006/0193206 | A1 * | 8/2006 | Alinat et al. ............ 367/88 |
| 2007/0021085 | A1 | 1/2007 | Kroeger |

OTHER PUBLICATIONS

B. Kroeger et al., "Robust Modem and Coding Techniques for FM Hybrid IBOC DAB", IEEE Transactions on Broadcasting, vol. 43, No. 4, Dec. 1997, pp. 412-420.

* cited by examiner

EQUALIZER FOR AM IN-BAND ON-CHANNEL RADIO RECEIVERS THAT DOES NOT REQUIRE ANALOG SIGNAL BANDWIDTH INFORMATION

CROSS-REFERENCE TO RELATED APPLICATION

This application is a divisional application of U.S. patent application Ser. No. 12/710,534, filed Feb. 23, 2010, which is a divisional application of U.S. patent application Ser. No. 11/272,978, filed Nov. 14, 2005. Both of these applications are hereby incorporated by reference.

FIELD OF THE INVENTION

This invention relates to radio broadcasting and, more particularly to methods of, and apparatus for, equalizing a signal in a receiver for use in an in-band on-channel digital broadcasting system.

BACKGROUND OF THE INVENTION

An AM compatible in-band on-channel (IBOC) digital broadcasting system simultaneously broadcasts analog and digital signals in a standard AM broadcasting channel. One AM IBOC system is described in U.S. Pat. No. 5,588,022. The broadcast signal includes an amplitude modulated radio frequency signal having a first frequency spectrum. The amplitude modulated radio frequency signal includes a first carrier modulated by an analog program signal. The signal also includes a plurality of digitally modulated carrier signals within a bandwidth, which encompasses the first frequency spectrum. Each of the digitally modulated carrier signals is modulated by a digital signal. A first group of the digitally modulated carrier signals lies within the first frequency spectrum and is modulated in quadrature with the first carrier signal. Second and third groups of the digitally modulated carrier signals lie outside of the first frequency spectrum and are modulated both in-phase and in quadrature with the first carrier signal. The subcarriers are divided into primary, secondary and tertiary partitions. Some of the subcarriers are complementary subcarriers.

The received multi-carrier signal requires equalization in the presence of dynamic channel response variations. Without such equalization, a distorted signal would be detected and the digital broadcasting signal information would be unrecoverable. An equalizer enhances the recoverability of the digital audio broadcasting signal information. Equalizers for use in receivers that receive AM in-band on-channel signals are disclosed in U.S. Pat. Nos. 5,559,830; 6,292,511; 6,295,317; and 6,480,536.

The use of complementary subcarriers for hybrid secondary and tertiary partitions in the AM compatible digital audio broadcasting signal creates an orthogonal relationship with the analog host signal. Prior equalization implementations for secondary partitions required knowledge of whether the analog host bandwidth was limited to ±5 kHz. If the analog was limited to ±5 kHz, then the secondary partitions were equalized independently to better accommodate adjacent channel interference. Otherwise the secondary partitions were first complementary combined to cancel the analog signal in this region.

There is a need for an equalization technique that does not require analog bandwidth information.

SUMMARY OF THE INVENTION

This invention provides a method for equalizing OFDM symbol vectors received on AM in-band on-channel radio signal including a main carrier and first and second BPSK modulated subcarriers. The method comprises: computing a BPSK magnitude signal; filtering the BPSK magnitude signal; filtering complex samples received on the main carrier; using the filtered BPSK magnitude signal and the filtered complex samples received on the main carrier to compute a plurality of flat fade equalization coefficients; and multiplying the OFDM symbol vectors by the flat fade equalization coefficients.

Receivers that include equalizers, which operate in accordance with the above method, are also provided.

DETAILED DESCRIPTION OF THE INVENTION

Figure 1:
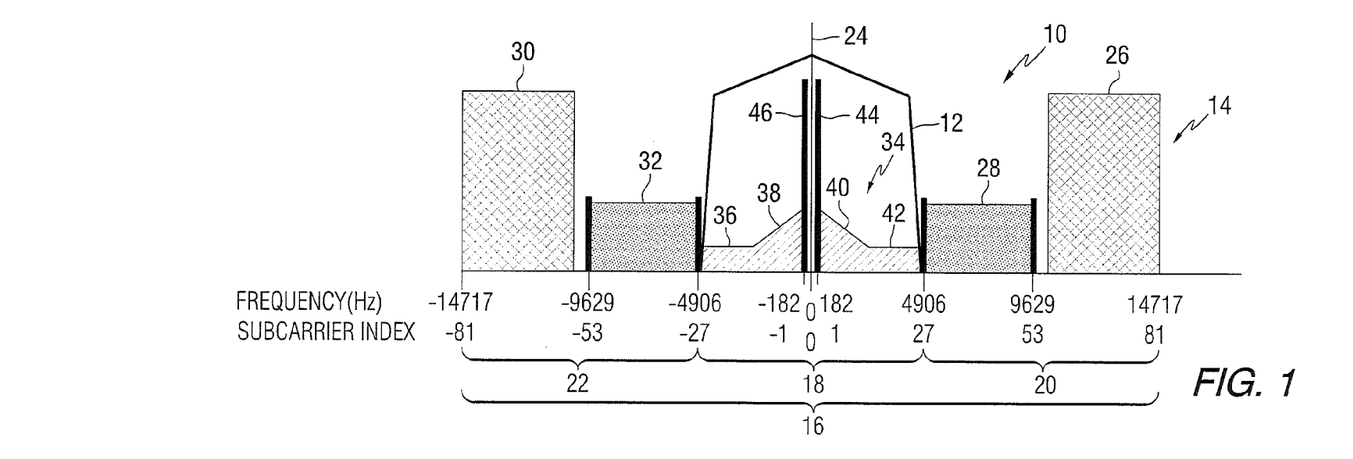
FIG. 1 is a spectral diagram of the AM hybrid IBOC signal.

Referring to the drawings, FIG. 1 is a spectral diagram of an AM hybrid IBOC signal. The AM hybrid IBOC waveform 10 includes the conventional AM analog signal 12 (bandlimited to about ±5 kHz) along with a nearly 30 kHz wide digital audio broadcasting (DAB) signal 14 transmitted beneath the AM signal. The spectrum is contained within a channel 16 having a bandwidth of about 30 kHz. The channel is divided into a central frequency band 18, and upper 20 and lower 22 frequency bands. The central frequency band is about 10 kHz wide and encompasses frequencies lying within about ±5 kHz of the center frequency $f_o$ of the channel. The upper sideband extends from about +5 kHz from the center frequency to about +15 kHz from the center frequency. The lower sideband extends from about −5 kHz from the center frequency to about −15 kHz from the center frequency.

AM hybrid IBOC DAB signal format in one embodiment of the invention comprises the analog modulated carrier signal 24 plus 162 OFDM subcarrier locations spaced at approximately 181.7 Hz, spanning the central frequency band and the upper and lower sidebands. Coded digital information, representative of the audio or data signals (program material), is transmitted on the subcarriers. The symbol rate is less than the subcarrier spacing due to a guard time between symbols.

As shown in FIG. 1, the upper sideband is divided into a primary partition 26 and a secondary partition 28, and the lower sideband is divided into a primary partition 30 and a secondary partition 32. The digital signals are transmitted in the primary and secondary partitions on either side of the host analog signal, as well as underneath the host analog signal in a tertiary partition 34. The tertiary partition 34 can be considered to include a plurality of groups of subcarriers labeled 36, 38, 40 and 42 in FIG. 1. Subcarriers within the tertiary partition that are positioned near the center of the channel are referred to as inner subcarriers and subcarriers within the tertiary partition that are positioned farther from the center of the channel are referred to as outer subcarriers. In this example, the power level of the inner subcarriers in groups 38 and 40 is shown to decrease linearly with frequency spacing from the center frequency. The remaining groups of subcarriers 36 and 42 in the tertiary sideband have substantially constant power levels.

FIG. 1 also shows two reference subcarriers 44 and 46, for system control, that are positioned at the first subcarrier positions immediately adjacent to the analog modulated carrier and have power levels which are fixed at a value that is different from the other sidebands.

The center carrier 24, at frequency $f_o$, is not QAM modulated, but carries the main analog amplitude modulated carrier. The synchronization and control subcarriers 44 and 46 are modulated in quadrature to the carrier. The remaining subcarriers of the tertiary partition, positioned at locations designated as 2 through 26 and −2 through −26 on either side of the AM carrier, are modulated with QPSK. Representative subcarrier locations are identified by the subcarrier index shown in FIG. 1. Subcarriers at locations 2 through 26 and −2 through −26 on either side of the central frequency, are referred to as tertiary subcarriers and are transmitted in complementary pairs such that the modulated resultant DAB signal is in quadrature to the analog modulated AM signal. The use of complementary subcarrier pairs in an AM IBOC DAB system is shown in U.S. Pat. No. 5,859,876. The synchronization and control subcarriers 44 and 46 are also modulated as a complementary pair.

The double sideband (DSB) analog AM signal occupies the bandwidth in the ±15 kHz region. The lower and upper tertiary partitions occupy sub-bands from about 0 to about −5 kHz and from about 0 to about +5 kHz regions, respectively. These tertiary partitions are negative complex conjugates of each other and are characterized as complementary. This complementary property maintains an orthogonal relationship between the analog and digital tertiary signals such that they can be separated in a receiver, while existing conventional receivers can still receive the analog AM signal. The tertiary partitions must be complementary combined to extract the digital signal while canceling the analog crosstalk. The secondary partitions also have the complementary property, so they can be processed at the receiver either independently, or after complementary combining, depending on interference conditions and audio bandwidth. The primary partitions are transmitted independently.

Figure 2:
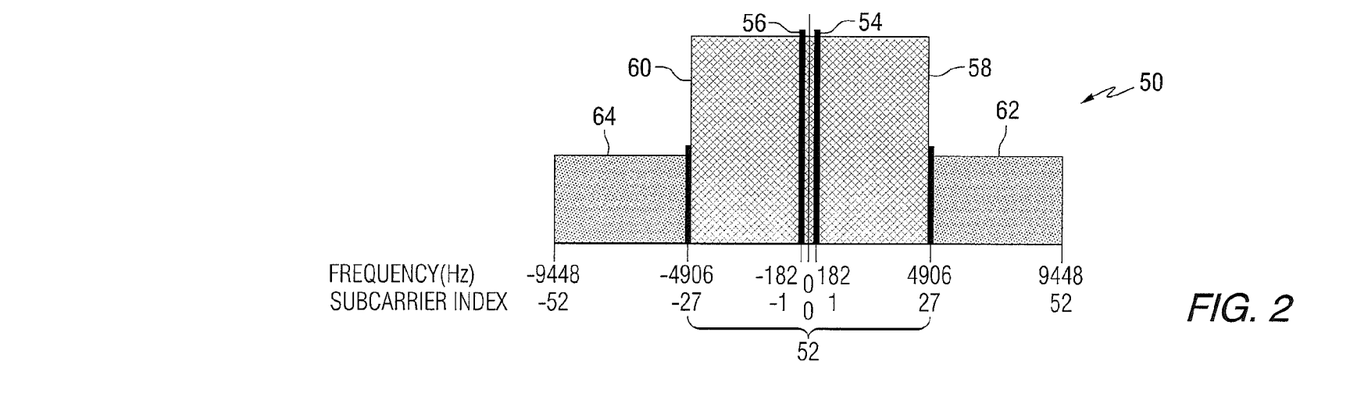
FIG. 2 is a spectral diagram of the AM all-digital IBOC signal.

FIG. 2 is a spectral diagram of an all-digital IBOC signal 50. The power of the central frequency band 52 subcarriers is increased, relative to the hybrid format of FIG. 1. Again, the two subcarriers 54 and 56 located at locations −1 and +1 use binary phase shift keying to transmit timing information. A core upper sideband 58 is comprised of carriers at locations 2 through 26, and a core lower sideband 60 is comprised of subcarriers at locations −2 through −26. Sidebands 58 and 60 form primary partitions. Two groups 62 and 64 of additional enhancement subcarriers occupy locations 27 through 54 and −54 through −27 respectively. Group 62 forms a secondary partition and group 64 forms a tertiary partition. The all-digital format of FIG. 2 is very similar to the hybrid format except that the AM signal is replaced with a delayed and digitally encoded tuning and backup version of the program material. The central frequency band occupies approximately the same spectral location in both the hybrid and all-digital formats. In the all-digital format, there are two options for transmitting the main version of the program material in combination with the tuning and backup version. The all-digital system has been designed to be constrained within ±10 kHz of the channel central frequency, $f_o$, where the main audio information is transmitted within ±15 kHz of $f_o$, and the less important audio information is transmitted in the wings of the channel mask out to ±10 kHz at a lower power level. This format allows for graceful degradation of the signal while increasing coverage area. The all-digital system carries a digital time diversity tuning and backup channel within the ±5 kHz protected region (assuming the digital audio compression is capable of delivering both the main and audio backup signal within the protected ±5 kHz). The modulation characteristics of the all-digital system are based upon the AM IBOC hybrid system.

The all-digital IBOC signal includes a pair of primary partitions in the ±5 kHz region, a secondary partition in the −5 kHz to −10 kHz region, and a tertiary partition in the +5 kHz to +10 kHz region. The all-digital signal has no analog component, and all partitions are transmitted independently (that is, the partitions are not complementary).

Figure 3:
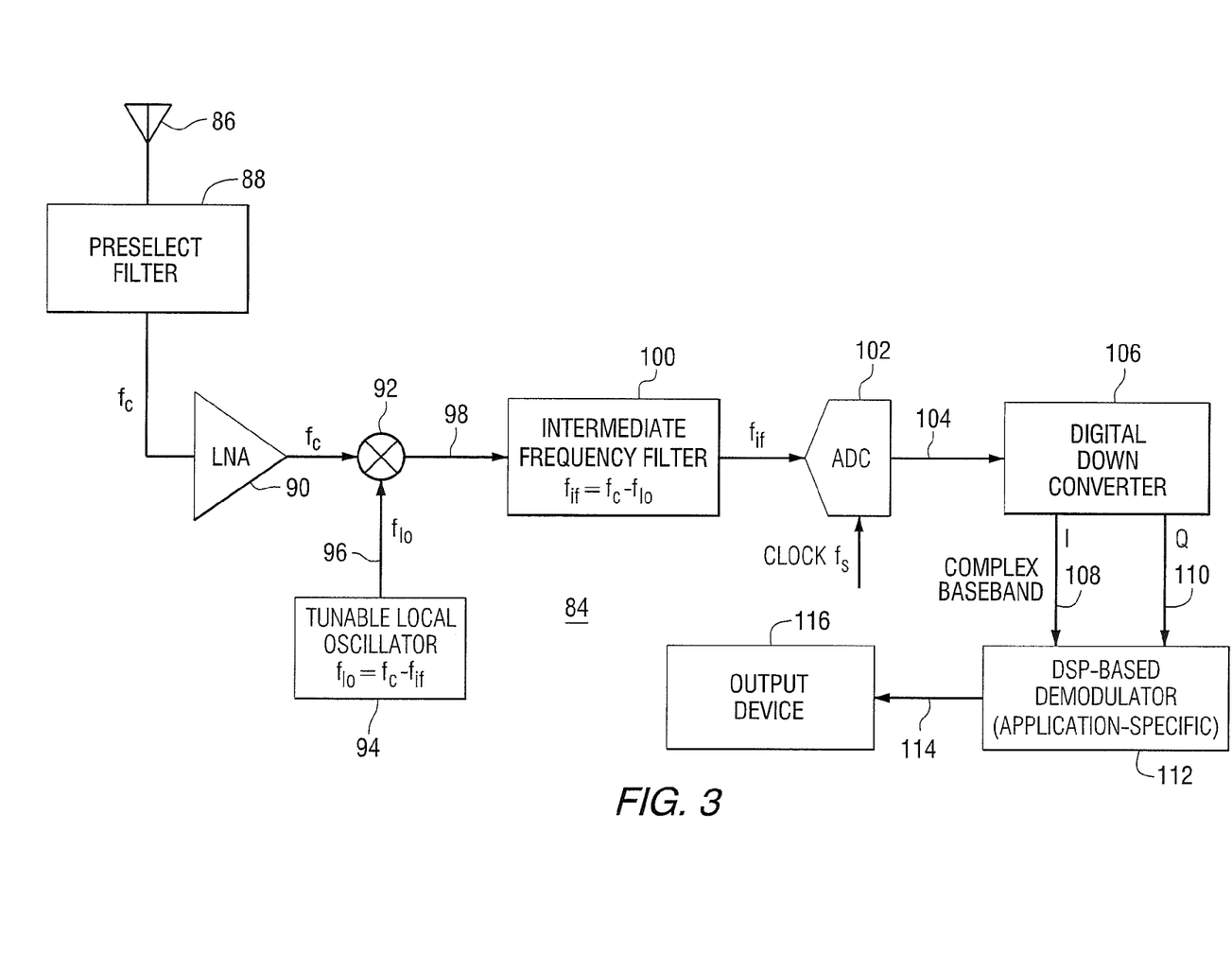
FIG. 3 is a functional block diagram of an AM IBOC receiver.

FIG. 3 is a functional block diagram of an IBOC receiver 84 constructed in accordance with this invention. The IBOC signal is received on antenna 86. A bandpass preselect filter 88 passes the frequency band of interest, including the desired signal at frequency $f_c$, but rejects the image signal at $f_c-2f_{if}$ (for a low side lobe injection local oscillator). Low noise amplifier 90 amplifies the signal. The amplified signal is mixed in mixer 92 with a local oscillator signal $f_{lo}$ supplied on line 94 by a tunable local oscillator 96. This creates sum $(f_c+f_{lo})$ and difference $(fc-f_{lo})$ signals on line 98. Intermediate frequency filter 100 passes the intermediate frequency signal $f_{if}$ and attenuates frequencies outside of the bandwidth of the modulated signal of interest. An analog-to-digital converter 102 operates using a clock signal $f_s$ to produce digital samples on line 104 at a rate $f_s$. Digital down converter 106 frequency shifts, filters and decimates the signal to produce lower sample rate in-phase and quadrature signals on lines 108 and 110. A digital signal processor based demodulator 112 then provides additional signal processing to produce an output signal on line 114 for output device 116.

Figure 4:
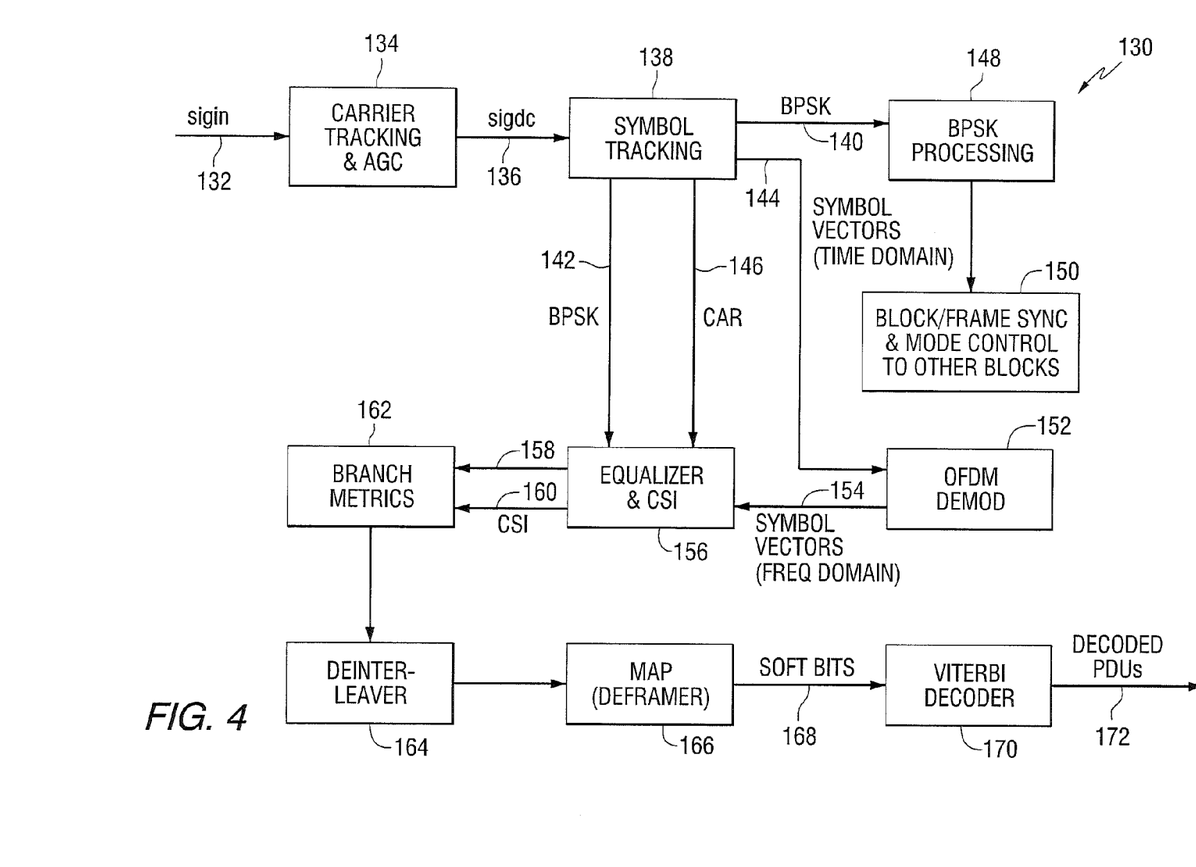
FIG. 4 is a block diagram of a modem for an AM IBOC receiver.

The receiver in FIG. 3 includes a modem constructed in accordance with this invention. FIG. 4 is a functional block diagram of an AM HD Radio™ modem 130 showing the functional location of the carrier tracking of this invention. An input signal on line 132 from the digital down converter is subject to carrier tracking and automatic gain control as shown in block 134. The resulting signal on line 136 is subjected to a symbol tracking algorithm 138 that produces the BPSK signal on lines 140 and 142, symbol vectors (in the time domain) on line 144, and the analog modulated carrier on line 146. BPSK processing, as shown in block 148 produces block/frame sync and mode control information 150 that is used by functions illustrated in other blocks. An OFDM demodulator 152 demodulates the time domain symbol vectors to produce frequency domain symbol vectors on line 154.

The equalizer 156 processes the frequency domain symbol vectors in combination with the BPSK and carrier signals to produce equalized signals on line 158 and channel state information on line 160. These signals are processed to produce branch metrics 162, deinterleaved in a deinterleaver 164, and mapped in a deframer 166 to produce soft decision bits on line 168. A Viterbi decoder 170 processes the soft decision bits to produce decoded program data units on line 172.

For clarity, we differentiate the OFDM vectors as time domain and frequency domain vectors, each representing the same information. The modem processes these OFDM vectors in the following order (referring to FIG. 4): Carrier Tracking, Symbol Tracking, OFDM Demodulation & BPSK processing, and then Equalization. The input to the modem comprises time domain vectors, or just a sequence of time samples; the Carrier Tracking operates in the time domain. The Symbol Tracking operates on the time domain samples and outputs (symbol synchronized) time domain OFDM vectors, and also computes the middle 3 FFT bins (0,±1) representing the main carrier and BPSK subcarriers in the frequency domain. The main carrier and the BPSK subcarriers are used for the equalization and are conveniently received from the symbol tracking, although they could also be received from the OFDM demodulation function (windowed FFT) having the same redundant 3 middle FFT bins. The Equalizer always operates on the sequence of frequency domain OFDM vectors.

This invention relates to a method and apparatus for equalizing either the hybrid or all-digital AM IBOC signals. The equalizer is comprised of two cascaded components, a flat fade equalizer followed by a partition equalizer with noise variance estimates used subsequently in the generation of channel state information (CSI). Flat fade compensation is applied in a similar manner to both the hybrid and all-digital signals. The partition equalizer operates on each of the partitions of the received signal. In one example, each partition consists of a set of 25 OFDM subcarriers, spanning approximately 5 kHz per partition. The partitions of the all-digital IBOC signal comprise a pair of primary partitions, a secondary partition and a tertiary partition, and are equalized independently. However the secondary and tertiary partitions of the hybrid signal involve additional processing and combining techniques described below. Several other single subcarriers are also transmitted between the partitions and use a simpler equalization technique than described here.

The flat fade compensation (equalizer) is described next. The flat fade compensation involves phase compensation using the main carrier phase, and magnitude equalization using the imaginary components of the BPSK signal. This flat fade compensation should be applied to all OFDM subcarriers.

Consider a single digital QAM (complex) symbol ($Q(n,1) = x+j\cdot y$), and an analog signal component ($a(n,1) = u+j\cdot v$) of an AM IBOC signal. This symbol is one of a group of QAM symbols transmitted in the $n^{th}$ OFDM symbol at subcarrier frequency $f_c$. The QAM symbol is transmitted using a complementary subcarrier pair to avoid AM crosstalk.

$$s(t)=[a(n,1)+Q(n,1)]\cdot w(t)\cdot e^{j\cdot 2\pi f_c \cdot t}+[a(n,-1)+Q(n,-1)]\cdot w(t)\cdot e^{-j\cdot 2\pi f_c \cdot t} \text{ where } Q(n,-1)=-Q^*(n,1) \text{ and } a(n,-1)=a^*(n,1).$$

The receiver demodulates the signal, which has been added to the analog modulation component and is further corrupted by noise and phase error, to produce the following estimates of the symbols for the pair of subcarriers:

$$D(n,1)=\int (s(t)+n(t))\cdot w(t) e^{-j\cdot 2\pi f_c \cdot t+j\cdot \phi}\cdot dt = Q(n,1)\cdot e^{j\cdot \phi}+a(n,1)\cdot e^{j\cdot \phi}+n_1$$

$$D(n,-1)=\int (s(t)+n(t))\cdot w(t) e^{-j\cdot 2\pi f_c \cdot t+j\cdot \phi}\cdot dt = Q(n,-1)\cdot e^{j\cdot \phi}+a(n,-1)\cdot e^{j\cdot \phi}+n_{-1}.$$

To show the effect of the complementary combining, the analog component can be extracted by summing the two components. The analog signal can be reproduced using the real part of the result, or, more commonly, computing its magnitude.

$$\frac{D(n,1)+D^*(n,-1)}{2} = \frac{Q(n,1)\cdot e^{j\phi}+a(n,1)\cdot e^{j\phi}+n_1-Q(n,1)\cdot e^{-j\phi}+a(n,1)\cdot e^{-j\phi}+n^*_{-1}}{2}$$

$$= -j\cdot Q(n,1)\cdot \sin(\phi)+a(n,1)\cdot \cos(\phi)+n_c+j\cdot n_s$$

$$\cong a(n,1); \text{ when } \phi \text{ and noise are sufficiently small.}$$

The digital symbol is extracted as $$\frac{D(n,1)-D^*(n,-1)}{2} = \frac{Q(n,1)\cdot e^{j\phi}+a(n,1)\cdot e^{j\phi}+n_1+Q(n,1)\cdot e^{-j\phi}-a(n,1)\cdot e^{-j\phi}-n^*_{-1}}{2}$$

$$= Q(n,1)\cdot \cos(\phi)-j\cdot a(n,1)\cdot \sin(\phi)+n_c+j\cdot n_s$$

$$\cong Q(n,1); \text{ when } \phi \text{ and noise are sufficiently small.}$$

The BPSK sequence is transmitted on the first pair of OFDM subcarriers on either side of the main carrier. These BPSK subcarriers are transmitted at a gain of $G_{BPSK}$, relative to the main carrier at a level of 1. So each BPSK symbol can be recovered and scaled with the following expression:

$$B(n) = \frac{D(n, 1) - D^*(n, 1)}{2 \cdot G_{BPSK}}$$

$$= \frac{(x + j \cdot y) \cdot \cos(\phi) - j \cdot a(n, 1) \cdot \sin(\phi) + n_c + j \cdot n_s}{G_{BPSK}}$$

$$\cong \frac{x + j \cdot y}{G_{BPSK}}; \text{ when } \phi \text{ and noise are sufficiently small.}$$

However, we are interested in an estimate of the absolute value of the BPSK bit (real scalar) for subsequent scaling of the signal. For this particular BPSK symbol, where $Q(n,1) = x+j\cdot y$, we arbitrarily choose $x=0$, and the information bit is imposed in the imaginary dimension. To extract the scalar information $R(n)$ from $B(n)$, either its magnitude can be computed, or the absolute value of the imaginary component y can be extracted from $B(n)$.

$$R(n) = |B(n)|, \text{ or } R(n) = abs[Im\{B(n)\}].$$

The magnitude estimate is generally less accurate than the absolute value of the imaginary computation when the phase error is small. The magnitude is also more computationally complex, so we choose to avoid the magnitude computation in favor of the imaginary component computation. The estimate of the channel magnitude $R(n)$ can be computed from $B(n)$, or more directly from $D(n,1)$ and $D^*(n,-1)$.

$$R(n) = abs[Im\{B(n)\}]$$

$$= \frac{abs[Im\{D(n, 1)\} - Im\{D^*(n, -1)\}]}{2 \cdot G_{BPSK}}$$

$$= \frac{abs[Im\{D(n, 1)\} + Im\{D(n, -1)\}]}{2 \cdot G_{BPSK}}.$$

Notice that $R(n)$ is a real-valued scalar.

Figure 5:
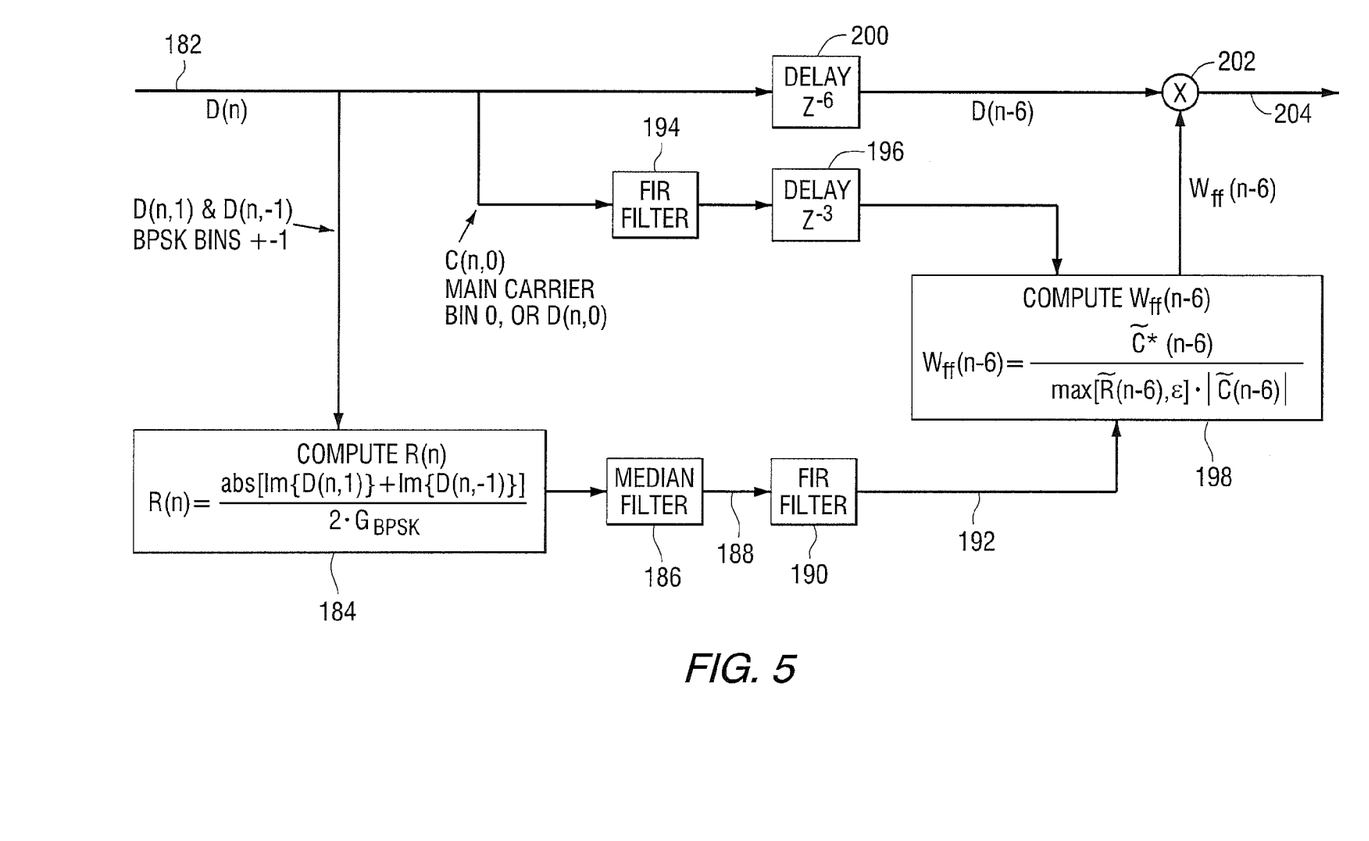
FIG. 5 is a block diagram of a flat fade equalizer constructed in accordance with the invention.

A functional block diagram of the flat fade equalizer 180 is presented in FIG. 5. An input $D(n)$ from the OFDM demodulator is supplied on line 182. In this embodiment, the input is a 256-sample vector for each symbol n. $R(n)$ is computed as shown in block 184 and passed to a median filter 186 to produce a first filtered signal on line 188. The first filtered signal is further filtered by a finite impulse response filter 190 to produce a second filtered signal on line 192.

In this embodiment, the filtering for the BPSK magnitude signal $R(n)$ includes a 7-tap median filter cascaded with a 7-tap FIR filter. This median filter can be implemented by placing the samples of $R(n)$ in a 7-element circular buffer, then computing the median of the 7 samples. The median filter has a delay of 3 samples. The 7-tap FIR filter has a delay of 3 samples and can be implemented using the following 7 coefficients:

$$h(k) = \left(\frac{1}{16} \; \frac{2}{16} \; \frac{3}{16} \; \frac{4}{16} \; \frac{3}{16} \; \frac{2}{16} \; \frac{1}{16}\right).$$

The total delay of the median and FIR filters is 6 samples. The filtered channel magnitude can be expressed as $$\tilde{R}(n - 6) = \sum_{k=0}^{6} h(k) \cdot \{\text{median}[R(n - k)]\};$$

where the median is computed over 7 samples.

The main carrier phase is also corrected as a flat fade component. However, this phase should be filtered independently of the previous BPSK magnitude. This is due to the increased phase noise on carrier samples near pinchoff at the negative analog modulation peaks. The same FIR filtering 194 defined for the BPSK magnitude can be used for the main carrier phase, although the median filtering should not be used, but replaced with an equivalent delay 196 to match the delay of the magnitude component. The main carrier samples $C(n)$ can be computed independently over each OFDM symbol, or the value computed in the OFDM demodulation can be used. The filtering of the main carrier component is as follows:

$$\tilde{C}(n - 3) = \sum_{k=0}^{6} h(k) \cdot C(n - k).$$

The flat fade equalizer weight is the reciprocal of the filtered channel magnitude (with divide by zero protection, $\epsilon$), while applying the conjugate of the main carrier phase, after an appropriate delay, $$W_{ff} = \frac{\tilde{C}^*(n - 6)}{\max[\tilde{R}(n - 6), \varepsilon] \cdot |\tilde{C}(n - 6)|}$$

as shown in block 198.

The original input is delayed as shown in block 200 and multiplied by $W_{ff}$ as shown in multiplier 202 to produce an output 256-sample vector for each new symbol n–6 after flat fade equalization on line 204.

The algorithm for computing the flat fade equalization coefficient $W_{ff}$ for each new OFDM symbol is summarized next:

| "Flat Fade Equalization algorithm" |
|---|
| $R(n) = abs[Im\{B(n)\}] = \dfrac{abs[Im\{D(n, 1)\} + Im\{D(n, -1)\}]}{2 \cdot G_{BPSK}};$    compute BPSK signal amplitude; nominal $R(n) = 1$ |
| $\tilde{R}(n - 6) = \sum_{k=0}^{6} h(k) \cdot \{\text{median}[R(n - k)]\};$ filtered 7 – sample median, delay = 6 symbols |

-continued

"Flat Fade Equalization algorithm"

$$\tilde{C}(n-3) = \sum_{k=0}^{6} h(k) \cdot C(n-k);\ \text{filtered the main carrier samples (complex), delay = 3 symbols}$$

$$W_{ff} = \frac{\tilde{C}^*(n-6)}{\max[\tilde{R}(n-6), \varepsilon] \cdot |\tilde{C}(n-6)|};\ \begin{array}{l}\text{compute flat fade coefficient for multiplication}\\ \text{with OFDM symbol subcarriers, delay = 6 symbols.}\end{array}$$

Filtering for the BPSK magnitude signal R(n) includes a 7-tap median filter cascaded with a 7-tap FIR filter.

The flat fade equalization described above is followed by the Partition equalization. Table 1 shows the locations of interleaved symbols (indices), including training symbols "T" within each partition block. Each column represents a partition.

(per partition). The hybrid secondary partitions are processed independently, and after complementary combining, allowing selection of the maximum metric, depending upon whether the analog audio bandwidth is limited to 5 kHz. The hybrid tertiary partitions are processed only after complementary combining.

TABLE 1

|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| 0 | 0 | "T" | 728 | 692 | 631 | 595 | 534 | 498 | 437 | 376 | 340 | 279 | 243 | 182 | 146 | 85 | 49 | "T" | 702 | 666 | 605 | 569 | 508 | 472 | 411 |
| 1 | 150 | 114 | 53 | 17 | "T" | 745 | 684 | 648 | 587 | 526 | 490 | 429 | 393 | 332 | 296 | 235 | 199 | 138 | 77 | 41 | "T" | 719 | 658 | 622 | 561 |
| 2 | 300 | 264 | 203 | 167 | 106 | 70 | 9 | "T" | 737 | 676 | 640 | 579 | 543 | 482 | 446 | 385 | 349 | 288 | 227 | 191 | 130 | 94 | 33 | "T" | 711 |
| 3 | 450 | 414 | 353 | 317 | 256 | 220 | 159 | 123 | 62 | 1 | "T" | 729 | 693 | 632 | 596 | 535 | 499 | 438 | 377 | 341 | 280 | 244 | 183 | 147 | 86 |
| 4 | 600 | 564 | 503 | 467 | 406 | 370 | 309 | 273 | 212 | 151 | 115 | 54 | 18 | "T" | 746 | 685 | 649 | 588 | 527 | 491 | 430 | 394 | 333 | 297 | 236 |
| 5 | "T" | 714 | 653 | 617 | 556 | 520 | 459 | 423 | 362 | 301 | 265 | 204 | 168 | 107 | 71 | 10 | "T" | 738 | 677 | 641 | 580 | 544 | 483 | 447 | 386 |
| 6 | 125 | 89 | 28 | "T" | 706 | 670 | 609 | 573 | 512 | 451 | 415 | 354 | 318 | 257 | 221 | 160 | 124 | 63 | 2 | "T" | 730 | 694 | 633 | 597 | 536 |
| 7 | 275 | 239 | 178 | 142 | 81 | 45 | "T" | 723 | 662 | 601 | 565 | 504 | 468 | 407 | 371 | 310 | 274 | 213 | 152 | 116 | 55 | 19 | "T" | 747 | 686 |
| 8 | 425 | 389 | 328 | 292 | 231 | 195 | 134 | 98 | 37 | "T" | 715 | 654 | 618 | 557 | 521 | 460 | 424 | 363 | 302 | 266 | 205 | 169 | 108 | 72 | 11 |
| 9 | 575 | 539 | 478 | 442 | 381 | 345 | 284 | 248 | 187 | 126 | 90 | 29 | "T" | 707 | 671 | 610 | 574 | 513 | 452 | 416 | 355 | 319 | 258 | 222 | 161 |
| 10 | 725 | 689 | 628 | 592 | 531 | 495 | 434 | 398 | 337 | 276 | 240 | 179 | 143 | 82 | 46 | "T" | 724 | 663 | 602 | 566 | 505 | 469 | 408 | 372 | 311 |
| 11 | 50 | 14 | "T" | 742 | 681 | 645 | 584 | 548 | 487 | 426 | 390 | 329 | 293 | 232 | 196 | 135 | 99 | 38 | "T" | 716 | 655 | 619 | 558 | 522 | 461 |
| 12 | 200 | 164 | 103 | 67 | 6 | "T" | 734 | 698 | 637 | 576 | 540 | 479 | 443 | 382 | 346 | 285 | 249 | 188 | 127 | 91 | 30 | "T" | 708 | 672 | 611 |
| 13 | 350 | 314 | 253 | 217 | 156 | 120 | 59 | 23 | "T" | 726 | 690 | 629 | 593 | 532 | 496 | 435 | 399 | 338 | 277 | 241 | 180 | 144 | 83 | 47 | "T" |
| 14 | 500 | 464 | 403 | 367 | 306 | 270 | 209 | 173 | 112 | 51 | 15 | "T" | 743 | 682 | 646 | 585 | 549 | 488 | 427 | 391 | 330 | 294 | 233 | 197 | 136 |
| 15 | 650 | 614 | 553 | 517 | 456 | 420 | 359 | 323 | 262 | 201 | 165 | 104 | 68 | 7 | "T" | 735 | 699 | 638 | 577 | 541 | 480 | 444 | 383 | 347 | 286 |
| 16 | 25 | "T" | 703 | 667 | 606 | 570 | 509 | 473 | 412 | 351 | 315 | 254 | 218 | 157 | 121 | 60 | 24 | "T" | 727 | 691 | 630 | 594 | 533 | 497 | 436 |
| 17 | 175 | 139 | 78 | 42 | "T" | 720 | 659 | 623 | 562 | 501 | 465 | 404 | 368 | 307 | 271 | 210 | 174 | 113 | 52 | 16 | "T" | 744 | 683 | 647 | 586 |
| 18 | 325 | 289 | 228 | 192 | 131 | 95 | 34 | "T" | 712 | 651 | 615 | 554 | 518 | 457 | 421 | 360 | 324 | 263 | 202 | 166 | 105 | 69 | 8 | "T" | 736 |
| 19 | 475 | 439 | 378 | 342 | 281 | 245 | 184 | 148 | 87 | 26 | "T" | 704 | 668 | 607 | 571 | 510 | 474 | 413 | 352 | 316 | 255 | 219 | 158 | 122 | 61 |
| 20 | 625 | 589 | 528 | 492 | 431 | 395 | 334 | 298 | 237 | 176 | 140 | 79 | 43 | "T" | 721 | 660 | 624 | 563 | 502 | 466 | 405 | 369 | 308 | 272 | 211 |
| 21 | "T" | 739 | 678 | 642 | 581 | 545 | 484 | 448 | 387 | 326 | 290 | 229 | 193 | 132 | 96 | 35 | "T" | 713 | 652 | 616 | 555 | 519 | 458 | 422 | 361 |
| 22 | 100 | 64 | 3 | "T" | 731 | 695 | 634 | 598 | 537 | 476 | 440 | 379 | 343 | 282 | 246 | 185 | 149 | 88 | 27 | "T" | 705 | 669 | 608 | 572 | 511 |
| 23 | 250 | 214 | 153 | 117 | 56 | 20 | "T" | 748 | 687 | 626 | 590 | 529 | 493 | 432 | 396 | 335 | 299 | 238 | 177 | 141 | 80 | 44 | "T" | 722 | 661 |
| 24 | 400 | 364 | 303 | 267 | 206 | 170 | 109 | 73 | 12 | "T" | 740 | 679 | 643 | 582 | 546 | 485 | 449 | 388 | 327 | 291 | 230 | 194 | 133 | 97 | 36 |
| 25 | 550 | 514 | 453 | 417 | 356 | 320 | 259 | 223 | 162 | 101 | 65 | 4 | "T" | 732 | 696 | 635 | 599 | 538 | 477 | 441 | 380 | 344 | 283 | 247 | 186 |
| 26 | 700 | 664 | 603 | 567 | 506 | 470 | 409 | 373 | 312 | 251 | 215 | 154 | 118 | 57 | 21 | "T" | 749 | 688 | 627 | 591 | 530 | 494 | 433 | 397 | 336 |
| 27 | 75 | 39 | "T" | 717 | 656 | 620 | 559 | 523 | 462 | 401 | 365 | 304 | 268 | 207 | 171 | 110 | 74 | 13 | "T" | 741 | 680 | 644 | 583 | 547 | 486 |
| 28 | 225 | 189 | 128 | 92 | 31 | "T" | 709 | 673 | 612 | 551 | 515 | 454 | 418 | 357 | 321 | 260 | 224 | 163 | 102 | 66 | 5 | "T" | 733 | 697 | 636 |
| 29 | 375 | 339 | 278 | 242 | 181 | 145 | 84 | 48 | "T" | 701 | 665 | 604 | 568 | 507 | 471 | 410 | 374 | 313 | 252 | 216 | 155 | 119 | 58 | 22 | "T" |
| 30 | 525 | 489 | 428 | 392 | 331 | 295 | 234 | 198 | 137 | 76 | 40 | "T" | 718 | 657 | 621 | 560 | 524 | 463 | 402 | 366 | 305 | 269 | 208 | 172 | 111 |
| 31 | 675 | 639 | 578 | 542 | 481 | 445 | 384 | 348 | 287 | 226 | 190 | 129 | 93 | 32 | "T" | 710 | 674 | 613 | 552 | 516 | 455 | 419 | 358 | 322 | 261 |

$A =$

Next, an algorithm is used to compute the equalizer coefficients and associated noise variances estimated for each of the 25 elements (columns for subcarriers) of each OFDM symbol within a partition (for example, the upper primary partition). The equalizer begins processing OFDM symbols as they are received. All partitions of the all-digital modes and the primary partitions of the hybrid mode are processed independently for each OFDM symbol containing 25 columns Each column of a partition contains either 1 or 2 training symbols (complex), depending upon which of the 16 rows is processed. The training symbol locations repeat every 16 OFDM symbols (rows). The locations of the training symbols are conveniently computed as a function of the particular row (modulo 16) of the OFDM symbol. The recent training symbols are next collected in a 25-column vector TS, simply updating the column(s) of TS(col) corresponding to the recent column(s) of the OFDM symbol containing the training symbol. The medians and variances of adjacent groups of symbols are computed after the adjacent group is updated with recent training symbols. Next the variances and medians are filtered using a two-dimensional recursive filter technique. The equalizer coefficients are computed from the filtered medians and equalization is applied to all the corresponding columns for the previous OFDM symbol, along with the updated noise variances (and reciprocals) for subsequent symbol processing. The details of this process are described next and presented in FIG. 6.

Figure 6:
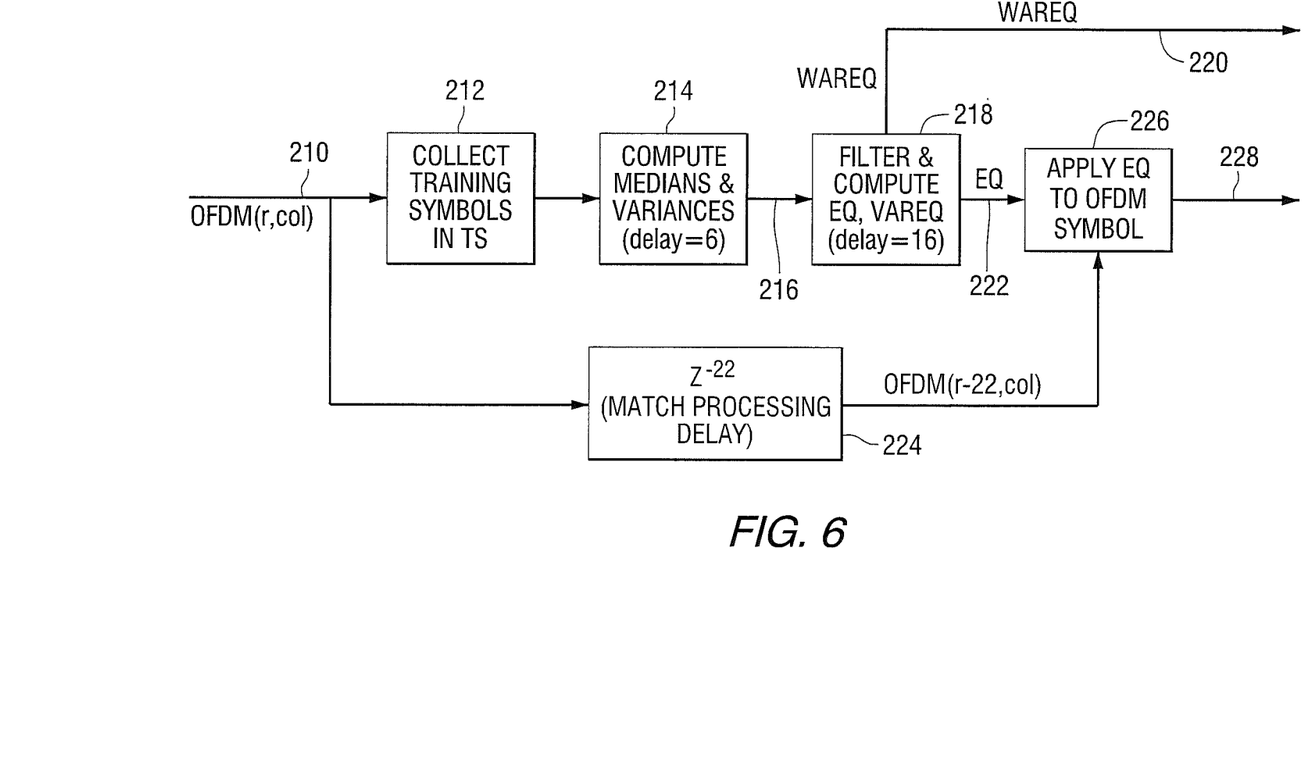
FIG. 6 is a block diagram of a partition equalizer constructed in accordance with the invention.

FIG. 6 is a functional block diagram of an equalizer that can be used for each 25-column partition. The OFDM symbol OFDM(r,col) is input on line 210. Training symbols are collected as shown in block 212. The medians and variances are computed as shown in block 214 to produce median and variance signals on line 216. These signals are filtered and equalized in block 218 to produce an equalized variance signal on line 220 (for use in subsequent channel state information (CSI) estimates) and equalization coefficients on line 222. After a delay as shown in block 224, the equalization coefficients are applied to the input signal as shown in block 226 to produce an output signal on line 228.

To compute the medians and variances from the training symbols (TS), first, create two, 1-row by 25-column matrices labeled TS and MED to be used to store the training symbols and median computations, respectively. The column indices (col=0 to 24) equal the corresponding columns of the training symbols as they are received for each OFDM symbol. Next, initialize the elements to zero.

Then, receive the next OFDM symbol row r (modulo 16) corresponding to a particular row (r) of an interleaver block. Identify the training symbol location(s), or column(s), for this row r, and place the training symbol(s) into corresponding TS(col). The training symbol in a row r can be updated using the following algorithm.

The partition equalizer performs several steps.

Step 1: Gather, collapse and update the Training Symbols into a convenient vector TS (representing the timely training symbol information) used in subsequent equalization processing.

"Algorithm to update TS for row r"
col=mod(3·r+1, 16); "identify which column has new TS"
TS(col)=OFDM(r,col)
if col<9 then TS(col+16)=OFDM(r, col+16); "if second TS in this row".

Step 2: Create two, 25-column vectors labeled MED and logVAR to be used to store the computed median and log of the variance values for equalization and CSI. Median filtering of the local (time & freq) TS samples is used to produce a median value estimate of the TS. The outputs Med & logVAR are local estimates (not yet time or frequency (across subcarriers) smoothed) of these parameters.

The column indices equal the corresponding columns of the training symbols as they are received for each OFDM symbol. Then initialize the elements to zero.

Compute median and variance for the TS(col) 6 rows after that particular TS(col) was updated. This delay ensures that its adjacent training symbols are also updated for use in the following computation. Either 1 or 2 TS(col) values are updated for each new row r. A 9-sample median and variance are computed for columns 4 through 20 using ±4 values on either side of this training symbol. For example, the median computation for column 4 uses training symbols TS(0) through TS(8). Columns 0 through 3, and 21 through 24 are special cases since fewer than 9 samples are available at the ends to compute the median and variance values. The extreme missing values are replaced with duplicate values by folding near the ends, when necessary. For example in computing the median for column 3, TS(0) through TS(7) are used, and the missing TS(−1) column is replaced with TS(0) to provide 9 values for the median computation. The computed median and variance values are placed in MED(col) and logVAR (col). The following method (pseudocode) can be used to identify the appropriate columns to update at this row r, and gather the appropriate TS samples for the 9-sample median and log variance computations:

"Algorithm to update MED and log VAR vectors, delay = 6 symbols"
col = mod(3 · r + 15, 16) ; "identify first TS col for r − 6"
FOR m = 0 to 8 ; "gather 9 adjacent TS to place in buffer for MED & logVAR computation"
    colm = col + m − 4

$$TScolindx = \begin{cases} -1 - colm; & \text{if } colm < 0 \\ colm; & \text{otherwise} \end{cases}$$

TSmedbuff (m) = TS(TScolindx)
MED(col) = median(TSmedbuff) ; "complex median, separate real & imaginary"
"compute log base2 of VAR samples (vector)"

$$logVAR(col) = log2\left(max\left[\frac{1}{256}, min\left[256, \frac{1}{8} \cdot \sum_{m=0}^{8} |MED(col) - TSmedbuff(m)|^2\right]\right]\right)$$

if col < 9 then ; "update second TS in this row if exists - - - "
    col2 = col + 16
    FOR m = 0 to 8
        colm = col2 + m − 4

$$TScolindx = \begin{cases} 49 - colm; & \text{if } colm > 24 \\ colm; & \text{otherwise} \end{cases}$$

TSmedbuff (m) = TS(TScolindx)

```
MED(col2) = median(TSmedbuff) ; "complex median, separate real & imaginary"
```

$$\text{logVAR(col2)} = \log 2\left(\max\left[\frac{1}{256}, \min\left[256, \frac{1}{8} \cdot \sum_{m=0}^{8} |\text{MED(col2)} - \text{TSmedbuff(m)}|^2\right]\right]\right)$$

```
end if.
```

To compute the equalizer coefficients and channel state information (CSI), the next step is to smooth (filter) the median and variance values over time and frequency (columns). The log of the variance is used for smoothing the squared noise samples having a potentially large dynamic range over the subcarriers.

Create two, 25-column vectors labeled MED1 and logVAR1 to be used to store the recursive time-filtered median and log variance values, respectively. The column indices equal the corresponding columns of the training symbols as they are received for each OFDM symbol. Then initialize the elements to zero.

CSI and branch metrics after adjustment for equalizer gains. Note that the last line of the algorithm above computes VAREQ(col) in a manner that accommodates special conditions. It is not simply the antilog computation to convert logVAR (log of the variance estimate) to VAR. It accounts for the fact that the variance is computed on not-yet-equalized values, so an adjustment is made to be compatible with the equalized symbol values of the output. Further adjustment is made to avoid variance estimate errors when very high interference is present. Both of these adjustments are included in the factor max[Eqmagsq(col,max(Eqmagsq)/2] after the antilog.

```
"Algorithm to compute EQ & VAREQ from MED & logVAR, filter delay = 16 symbols"
"IIR filter MED and logVAR each col to get MED1 and logVAR1, q = 1/8 IIR coef"
MED1 = (1 – q) · MED1 + q · MED ;
logVAR1 = (1 – q) · logVAR1 + q · logVAR ;
"Smooth MED1 and logVAR1 across cols using quadratic - fit interpolator"
"MED2 & logVAR2 are the freq - smoothed median and variance estimates"
MED2 = QF (MED1) ; "compute quadratic fit using QF algorithm"
logVAR2 = QF(logVAR1) ; "compute quadratic fit using QF algorithm"
"Compute equalizer coefficients EQ from MED2"
medsq(col) = |MED2(col)|² ; col = 0 . . . 24 "save squared magnitudes"
```

$$\text{EQ(col)} = \frac{\text{MED2}^*(\text{col}) \cdot T}{\max[\text{medsq(col)}, 10^{-6}]}; \quad \begin{array}{l} \text{col} = 0 \ldots 24 \\ \text{"equalizer coeffs, } T = \text{Training sym."} \end{array}$$

```
"Compute antilog and equalize logVAR2 to produce VAREQ"
EQmagsq(col) = |EQ(col)|² ; col = 0 . . . 24
```

$$\text{VAREQ(col)} = 2^{\text{logVAR2(col)}} \cdot \max[\text{EQmagsq(col)}, \max(\text{EQmagsq})/2]; \text{col} = 0 \ldots 24.$$

Create two, 25-column vectors labeled MED2 and logVAR2 to be used to store the column or frequency-filtered median and log variance values, respectively. The column indices equal the corresponding columns of the training symbols as they are received for each OFDM symbol. Then initialize the elements to zero.

The equalizer values EQ are computed from MED2. The EQ values are generally the complex reciprocal of MED2 values, but with divide protection. The variance values logVAR2 are used to compute VAREQ for subsequent CSI and branch metrics after adjustment for equalizer gains.

Step 3: Next smooth the MED and logVAR values over time and frequency (subcarriers). The time smoothing with the IIR filter results in MED1 & logVAR1. The frequency smoothing using one of the quadratic fit functions results in MED2 & logVAR2. See first part of algorithm described below.

Step 4: The equalizer values EQ are computed from MED2. The EQ values are generally the complex reciprocal of MED2 values, but with divide protection. The variance values logVAR2 are used to compute VAREQ for subsequent The EQ(col) values are then applied to the corresponding data-bearing symbols to produce OFDMEQ(col) values for each column of the OFDM symbol (delayed by 22 OFDM symbols to account for the EQ processing delay). The VAREQ(col) values are used for subsequent CSI processing.

```
OFDMEQ(col)=OFDM(col)·EQ(col); col=0 . . . 24
   "equalize delayed OFDM symbol.
```

The algorithm described above uses a function called QF, which is a quadratic fit of the MED1 or logVAR1 matrices used to smooth the values across the columns (subcarriers) of these matrices. The smoothing of these values reduces the estimation and correction errors due to noise since the variation needing equalization is assumed to be smooth. The variation of these values across the columns can be a result of several factors. One factor is due to a residual symbol tracking timing error causing a linear phase shift across the subcarriers. Since the filtering is done in the I and Q complex domain, and not phase and magnitude, the I and Q components resulting from this linear phase shift cannot be corrected exactly with a linear fit, but rather a quadratic fit for I and Q complex components provides sufficient accuracy. Another variation can be due to the phase and amplitude perturbations due to frequency selective fading over the subcarriers, which can also be corrected by the quadratic fit. Phase and amplitude ripple from analog filtering prior to OFDM demodulation can be corrected if the ripple is small. Interference also tends to have a shape for logVAR that can be accommodated with a quadratic fit.

If the analog filter ripple is severe and deviates from a quadratic shape, then a different QF function is needed. Therefore two algorithm options are presented: the first QF function is best for correcting the variations due to residual symbol timing error, selective channel fading, and mild filter ripple; the second algorithm is designed to correct all these variations plus a more severe filter ripple.

The first QF function estimates three points over the subcarriers to which a quadratic shape is fitted to perform the smoothing correction. These points are estimated using FIR filters at the middle and two extreme endpoints of the subcarrier span. The middle point is properly estimated using a symmetric FIR filter over the middle subcarrier. The FIR filters at the endpoints have a centroid that is several bins from the ends. Although the quadratic fit could be normally designed to use the proper centroids near the endpoints and extrapolate the remaining subcarriers at the extreme ends, the performance tends to be better if the centroids are assumed to be located at the extreme subcarrier locations. The reason is that the extrapolation tends to accentuate the curvature of the quadratic fit in the presence of noise. However the algorithm can be modified to place the centroids at the location that yields the best overall performance.

Step 4a: The first quadratic fit function is intended to smooth the estimates with a partition shape (assumed quadratic) that provides near-optimum smoothing given likely channel conditions such as time-offset and selective fading properties. This is accomplished using the following algorithm.

---

"QF(x), Quadratic Fit function, input vector x, output vector y. (25 - element vectors)

$$wf(k) = \frac{\cos\left(\frac{\pi \cdot k}{12}\right)+1}{13}; \text{ for } k = 0 \ldots 11; \text{ stored coeffs for filter points}$$

$$ylow = \sum_{k=0}^{11} wf(k) \cdot x(k); \text{"output value at col 0"}$$

$$yhigh = \sum_{k=0}^{11} wf(k) \cdot x(24-k); \text{"output value at col 24"}$$

$$ymid = \frac{1}{12} \cdot \sum_{k=0}^{24} x(k) - \frac{13}{24} \cdot (ylow + yhigh); \text{"midpoint value at col 12"}$$

$$a = \frac{ylow + yhigh - 2 \cdot ymid}{288}; \text{"quadratic coef a"}$$

$$b = \frac{4 \cdot ymid - 3 \cdot ylow - yhigh}{24}; \text{"quadratic coef b"}$$

$$y(col) = a \cdot col^2 + b \cdot col + ylow; col = 0 \ldots 24; \text{"output vector y"}.$$

---

An alternate quadratic fit function QF is provided to accommodate IF filters with excessive ripple and group delay or gain variations. This function is different from the first since a different quadratic curve is used at each subcarrier location to form the FIR filter coefficients. These quadratic curves are pre-computed and stored in a 25 by 25 matrix W to be used as a multiplier for the row of 25 values from the subcarriers to be filtered. So instead of computing the quadratic fit across the 25 subcarriers for each new OFDM symbol as in the first algorithm, the second algorithm simply multiplies the vector of 25 subcarrier values by the matrix W for each OFDM symbol time.

This alternate QF function is applied in a similar manner as a method known as the Savitsky-Golay (SG) procedure; however, the alternate QF function generates the coefficients in a different manner resulting in improved filtering gain against noise while solving the endpoint dilemma. The SG procedure computes a least-squares fit centered on each point to smooth the data for that point. The result is a set of FIR filter coefficients about each subcarrier location to be smoothed. Two factors motivate the use of least squares smoothing. One is the variability of the values over the subcarriers, and the other is the endpoint dilemma where the subcarriers near the endpoints cannot be fitted with a symmetric set of FIR filter coefficients since there are no subcarriers to use in the filtering beyond the endpoints. The SG procedure exploits the properties of manipulated Vandermonde matrices to generate the FIR coefficients, generating a unique set of FIR filter coefficients for each subcarrier location to be smoothed. Although the SG procedure produces FIR filter coefficients that result in an unbiased estimate of each smoothed subcarrier value, the actual set of FIR coefficients do not have the best noise reduction filtering properties due to the excessive use of negative coefficient values. However, the alternate QF function uses the best possible quadratic fit FIR coefficients for noise reduction filtering or smoothing, while preserving the zero bias property of the SG procedure. Furthermore, the alternate QF function has more flexibility in establishing the span of FIR filter smoothing about the subcarrier locations.

One example of the alternate QF function is described as follows. The span of the nonzero FIR filter coefficients for each subcarrier location is set to 15 nonzero coefficients to accommodate the anticipated variability of values across the 25 subcarriers in the partition, although this can be adjusted. The unique FIR filter coefficients for each of the subcarrier locations m=0 . . . 24 are computed. The shape of the FIR coefficients is a quadratic function with four additional constraints defined as follows:

Constraint 1: The number of nonzero FIR filter coefficients is 15, with 10 zero coefficients remaining. The center nonzero coefficient is normally located on the subcarrier to be smoothed resulting in a symmetric FIR filter property, except that the 7 subcarriers on either end are constrained by using the 15 subcarrier locations on that end for the nonzero coefficients. Then the first nonzero coefficient location p for estimating (filtering) the subcarrier m can be identified by $p=\max(0,\min(17,m-7))$; "$p$ is the first nonzero coefficient location".

Constraint 2: Each set of the 25 sets of 25 FIR coefficients, having 15 nonzero coefficients and 10 zero coefficients, must sum to unity so that each FIR filter has a dc gain of one for each subcarrier location.

$$\sum_{k=0}^{24} FIR(m, k) = 1;$$

for the kth coefficient estimating the mth subcarrier.

Constraint 3: The centroid of the FIR filter for subcarrier m must also be m to ensure an unbiased estimate when the slope of the subcarrier data is assumed to be piecewise linear.

$$\sum_{k=0}^{24} k \cdot FIR(m, k) = m.$$

Constraint 4: Although the best noise reduction can be achieved by minimizing the sums of the squares of the coefficients, this does not provide the best local estimate for each subcarrier location, and would result in 15 linear coefficients for each FIR filter. A better constraint is to ensure that the quadratic function crosses zero at the unused coefficient locations just outside the 15 nonzero coefficients. This is possible for the 11 subcarrier locations 7 through 17, but this constraint cannot be met for the other subcarrier locations affected by the endpoint dilemma. Then the outer subcarrier locations have the zero crossing constraint only toward the inner point beyond the FIR coefficient span.

$y_m(k) = a_m \cdot k^2 + b_m \cdot k + c_m$; "quadratic for the kth coef for the mth subcarrier"

$y_m(p-1) = 0$; "constraint for $m = 7 \ldots 24$"

$y_m(p+15) = 0$; "constraint for $m = 0 \ldots 17$".

Constraint 1 simply establishes the range of the 15 nonzero coefficients for each of the 25 FIR filters having a quadratic characteristic over that range. Constraints 2, 3 and 4 constitute the three equations necessary to determine the quadratic coefficients $a_m$, $b_m$ and $c_m$ for each FIR filter. Although Constraint 4 may seem to overdetermine the middle sets of filter coefficients for $m = 7 \ldots 17$, having zero endpoints at both ends, this double constraint for these subcarriers is redundant, and all sets of coefficients are properly determined. An algorithm for generating the alternate QF1(x) FIR filter coefficient matrix W is defined next, and the resulting coefficient values for W are presented as shown below.

Step 4b: An alternate quadratic fit function QF is provided to accommodate IF filters with excessive ripple and group delay or gain variations. This function is different from the first since a different quadratic curve is used at each subcarrier location to form the FIR filter coefficients. These quadratic curves are pre-computed and stored in a 25 by 25 matrix W to be used as a multiplier for the row of 25 values from the subcarriers to be filtered. So instead of computing the quadratic fit across the 25 subcarriers for each new OFDM symbol as in the first algorithm, the second algorithm simply multiplies the vector of 25 subcarrier values by the matrix W for each OFDM symbol time. These are subjected to constraints 1-4, which result in the following algorithm.

"QF1(x), Alternate Quadratic Fit Matrix function, input row vector x, output vector y."
"first compute prestored coefficient matrix W (25 by 25)"
FOR m = 0 to 7

$$a(m) = \frac{14 - 3 \cdot m}{4760}$$

$$b(m) = \frac{1 + 2360 \cdot a(m)}{120}$$

$c(m) = -225 \cdot a(m) - 15 \cdot b(m)$
FOR k = 0 to 14
   $W(k, m) = a(m) \cdot k^2 + b(m) \cdot k + c(m)$
   $W(24 - k, 24 - m) = W(k, m)$ FOR m = 8 to 16
   FOR k = 0 to 14
      $W(k + m - 7, m) = W(k, 7)$
"This is the end of the prestored computation for filter matrix W"
"compute filtered output vector y for each new OFDM symbol"
$y = x \cdot W$ ; "matrix multiply yields output vector y".

Step 4c: A third alternative quadratic fit is described below.
Another alternate filter QF2(x) can be designed using all 25 possible nonzero coefficients for each FIR filter. This filter has a characteristic more similar to the first QF(x) filter, but is constructed in the matrix form W of the alternate filter.

"QF2(x), Alternate Quadratic Fit Matrix function, input row vector x, output vector y."
"first compute prestored coefficient matrix W (25 by 25)"
FOR m = 0 to 13

$$a(m) = \frac{2}{2925} - \frac{m}{11700}$$

$$b(m) = \frac{-1}{39} + \frac{11 \cdot m}{3900}$$

$$c(m) = \frac{25}{117} - \frac{2 \cdot m}{117}$$

FOR k = 0 to 24
   $W(k, m) = a(m) \cdot k^2 + b(m) \cdot k + c(m)$
   $W(24 - k, 24 - m) = W(k, m)$
"This is the end of the prestored computation for filter matrix W"
"compute filtered output vector y for each new OFDM symbol"
$y = x \cdot W$ ; "matrix multiply yields output row vector y".

In another aspect, the invention involves the adaptive complementary combining of the secondary partitions before equalization. The two independent secondary partitions are equalized independently, along with the associated VAREQ estimates. The branch metrics are computed independently and redundantly for all secondary soft code bits in the partition. The corresponding branch metrics are then added to produce one set of branch metrics. The equalization is also performed on the complementary combined secondary partitions to produce another set of branch metrics for the same set of secondary soft code bits. Then for each secondary soft code bit, the higher branch metric is selected as output for the corresponding secondary soft code bits.

The use of complementary subcarriers for hybrid secondary and tertiary partitions creates an orthogonal relationship with its analog host. A prior implementation of the secondary equalization required knowledge of whether the analog host bandwidth was limited to ±5 kHz. If the analog was limited to ±5 kHz, then the secondary partitions were equalized independently to better accommodate adjacent channel interference. Otherwise the secondary partitions were first complementary combined to cancel the analog signal in this region.

The input symbols to be equalized are delayed, to match the delay in the estimation of the equalizer parameters to provide timely application of the equalizer information. The EQ(col) values are then applied to the corresponding data-bearing symbols to produce OFDMEQ(col) values for each column of the OFDM symbol (delayed by 22 OFDM symbols to account for the EQ processing delay). The VAREQ(col) values are used for subsequent CSI processing.

The method of this invention does not make use of the analog bandwidth information; instead both independent and combined equalizations are performed, and later the maximum branch metric is selected. This yields more robust performance, especially when the analog bandwidth somewhat exceeds 5 kHz.

The tertiary subcarriers are always complementary combined prior to equalization. Tertiary equalization is then performed as described. The two secondary partitions are processed both independently and complementary combined, yielding three sets of equalized branch metrics for the single set of secondary soft code bits. The method of combining these three sets of branch metrics is described next.

The two independent secondary partitions are equalized independently, along with the associated VAREQ estimates. The branch metrics are computed independently and redundantly for all secondary soft code bits in the partition. The corresponding branch metrics are then added to produce one set of branch metrics. The equalization is also performed on the complementary combined secondary partitions to produce another set of branch metrics for the same set of secondary soft code bits. Then for each secondary soft code bit, the higher branch metric is selected as output for the corresponding secondary soft code bits.

As described above, the equalizer includes two parts: a flat fade compensation (equalizer) followed by a partition equalizer. The flat fade equalizer helps in fast fading cases and uses the main carrier (FFT bin $0$) and BPSK subcarriers (bins $\pm 1$). The partition equalizer is slower and operates on sparser training symbols in the partition, but is more accurate in the partition. The partition equalizer benefits from the flat fade equalizer to keep the training values in a relative smaller range.

The functions shown in the drawings can be implemented using known circuit components, including but not limited to, one or more processors or application specific integrated circuits.

While the invention has been described in terms of several examples, it will be apparent to those skilled in the art that various changes can be made to the described examples without departing from the scope of the invention as set forth in the following claims.

What is claimed is:

1. A method of equalizing OFDM symbol vectors received on an AM in-band on-channel radio signal including a main carrier and first and second BPSK modulated subcarriers, the method comprising:
    using a processor to compute a BPSK magnitude signal;
    filtering the BPSK magnitude signal;
    filtering complex samples received on the main carrier;
    using the filtered BPSK magnitude signal and the filtered complex samples received on the main carrier to compute a plurality of flat fade equalization coefficients; and
    multiplying the OFDM symbol vectors by the flat fade equalization coefficients.

2. The method of claim 1, wherein the step of filtering the BPSK magnitude signal comprises:
    passing the BPSK magnitude signal through a median filter and a finite impulse response filter.

3. The method of claim 1, wherein the step of filtering complex samples received on the main carrier comprises:
    passing the complex samples received on the main carrier through a finite impulse response filter.

4. The method of claim 1, wherein the step of computing a BPSK magnitude signal comprises:
    extracting an absolute value of an imaginary component of a BPSK symbol.

5. The method of claim 1, wherein the first and second BPSK modulated subcarriers are modulated in quadrature to the main carrier.

6. The method of claim 1, wherein the first and second BPSK modulated subcarriers are modulated as a complementary pair of subcarriers.

7. The method of claim 1, wherein the step of multiplying the OFDM symbol vectors by the flat fade equalization coefficients produces flat fade equalized OFDM symbol vectors, and the method further comprises:
    computing a plurality of partition equalization coefficients; and
    multiplying the flat fade equalized OFDM symbol vectors by the partition equalization coefficients to produce output OFDM symbol vectors.

8. A receiver for receiving an AM in-band on-channel radio signal including a main carrier and first and second BPSK modulated subcarriers, the receiver comprising:
    an input for receiving the AM in-band on-channel radio signal;
    an equalizer for computing a BPSK magnitude signal, for filtering the BPSK magnitude signal, for filtering complex samples received on the main carrier, for using the filtered BPSK magnitude signal and the filtered complex samples received on the main carrier to compute a plurality of flat fade equalization coefficients, and for multiplying the OFDM symbol vectors by the flat fade equalization coefficients; and
    an output device for producing an output in response to the AM in-band on-channel radio signal.

9. The receiver of claim 8, wherein the equalizer comprises:
    a median filter and a finite impulse response filter for filtering the BPSK magnitude signal.

10. The receiver of claim 8, wherein the equalizer comprises:
    a finite impulse response filter for filtering the complex samples received on the main carrier.

11. The receiver of claim 8, wherein the equalizer computes the BPSK magnitude signal by extracting an absolute value of an imaginary component of a BPSK symbol.

12. The receiver of claim 8, further comprising;
    a partition equalizer for computing a plurality of partition equalization coefficients, and multiplying the flat fade equalized OFDM symbol vectors by the partition equalization coefficients to produce output OFDM symbol vectors.

* * * * *